E. T. Balch.
Sun Shade.
Nº 99,282.  Patented Feb. 1, 1870.
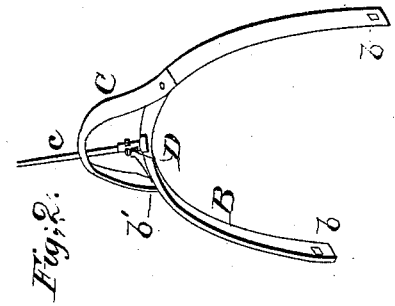
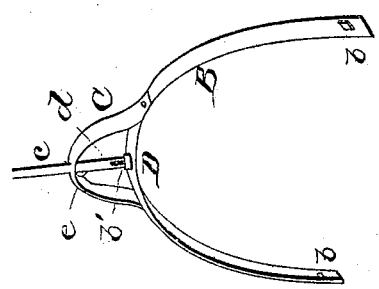
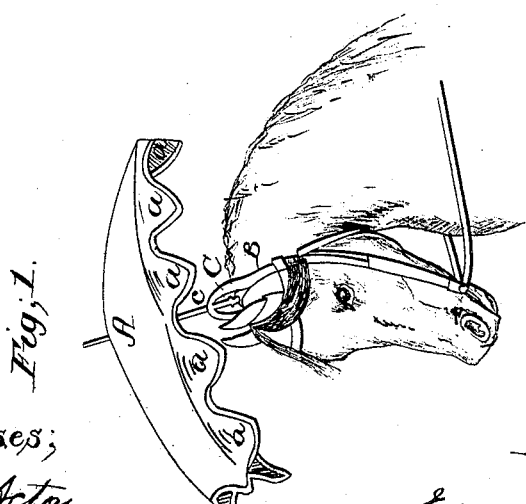
Witnesses:
A. Acton
John Lille
Inventor:
Edward T. Balch M D
per Francis D. Pastorius, Attorney

United States Patent Office.

EDWARD T. BALCH, OF PHILADELPHIA, PENNSYLVANIA.

Letters Patent No. 99,282, dated February 1, 1870; antedated January 20, 1870.

IMPROVEMENT IN SUN-SHADES FOR HORSES.

The Schedule referred to in these Letters Patent and making part of the same.

*To all whom it may concern:*

Be it known that I, EDWARD T. BALCH, M. D., of the city and county of Philadelphia, and State of Pennsylvania, have invented a new and useful Horse-Shade and Attachment; and I do hereby declare that the following is a full, clear, and exact description of the same, reference being had to the accompanying sheet of drawings, and to the letters of reference marked thereon.

My invention consists of an ordinary umbrella or sun-shade, with impending agitators. The stick of the same takes through a corresponding opening in a supporting-stand, on an arch or collar, which takes over the horse's head, and embraces an upwardly-projecting pin of the same, substantially as is hereinafter shown and described.

On reference to the accompanying sheet of drawings, making part of this specification—

Figure 1 shows my invention, applied to a horse's head.

Figure 2 shows the method of fixing the same on, in place.

Figure 3 is a view of the same, showing the method employed for holding the stick or handle from lifting.

Similar letters refer to similar parts in the several views.

A is a sun-shade, which folds or closes, and is similar, in all respects, to an ordinary parasol, with depending flaps or agitators, $a$, for assisting the current of air beneath it, and also to drive away flies and other insects that light on a horse's head and annoy him.

B is a strap or band, of any material, which takes over the horse's head, being held in place by a throat-strap in the openings $b$.

C is a steady-piece, which projects upwardly from the said band.

D is a stud fixed centrally between the ends of the band.

A pin, $b'$ projects outwardly from the same.

The stick $c$, of the sun-shade, passes through an opening in the steady-piece C, and over the stud D.

The pin $b'$ takes into the slots or openings $d$, in the stick, and is secured in place precisely similar to the method employed for attaching a bayonet to its musket.

A spring, $e$, on the stick, prevents it from lifting.

I do not claim to be the inventor of a device for simply protecting animals from the heat of the sun, being aware that awnings have been used for that purpose. My invention consists of a device which, while it protects the animal from the heat of the sun, at the same time creates a current of air above the head, and prevents flies and other insects from annoying the animal.

What I claim as my invention, and desire to secure by Letters Patent, is—

The sun-shade A, in combination with the strap B, steady-piece C, and the pin D, substantially as and for the purpose shown and described.

In testimony whereof, I hereunto sign my name to this specification, in presence of two subscribing witnesses.

EDW. T. BALCH, M. D.

Witnesses:
FRANCIS D. PASTORIUS,
A. ACTON.